Patented Aug. 24, 1926.

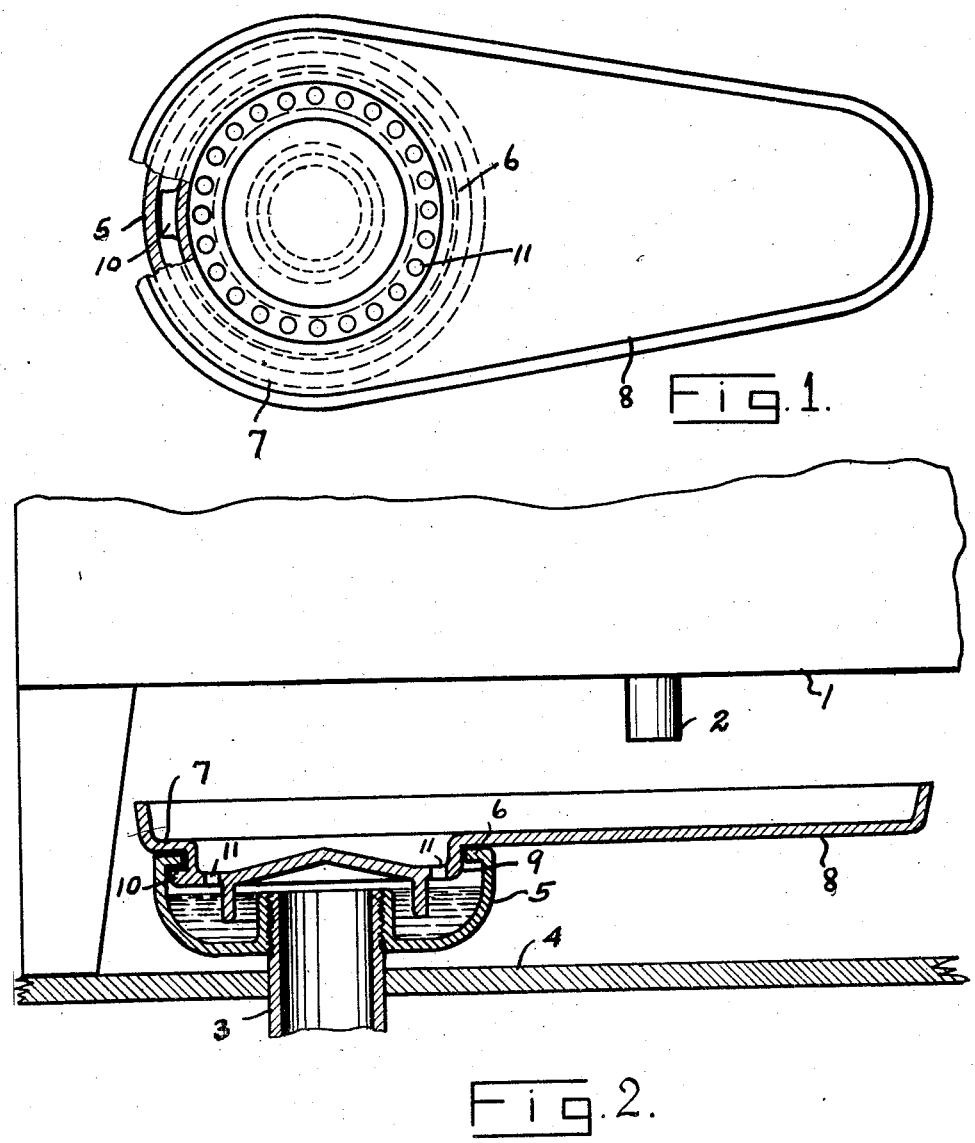

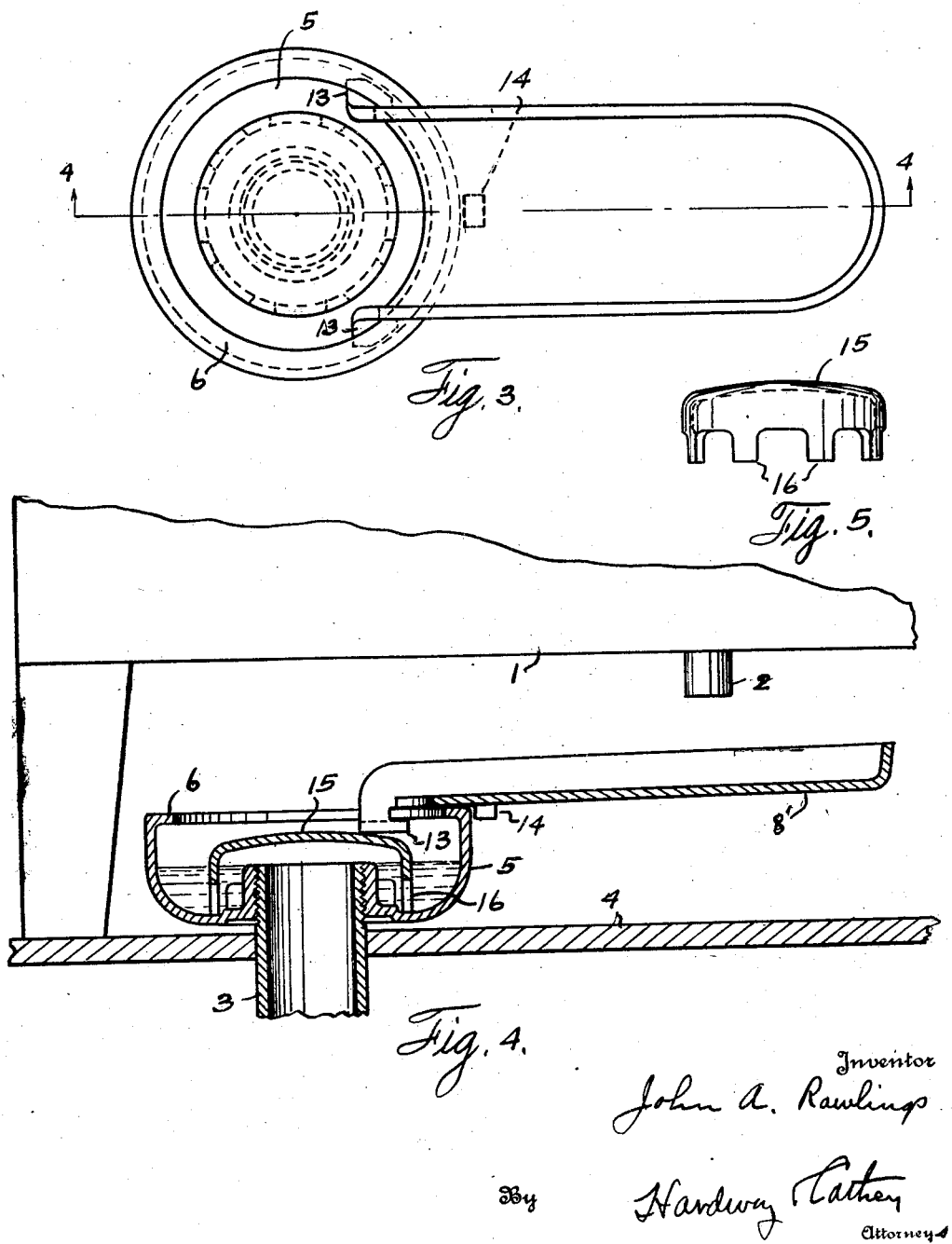

1,596,997

UNITED STATES PATENT OFFICE.

JOHN A. RAWLINGS, OF HOUSTON, TEXAS.

DRIP PAN.

Application filed November 6, 1925. Serial No. 67,246.

This invention relates to new and useful improvements in a drip pan.

One object of the invention is to provide a drip pan particularly designed for use in connection with a refrigerator, or ice box, to catch the drippings from the drain nozzle of the refrigerator.

Another object of the invention is to produce a device of the character described, which is readily adjustable so that it can be turned, or revolved on its support, so that it can be readily aligned under the refrigerator drain nozzle.

A further feature of the invention is to provide a device of the character described which is of simple construction and may be cheaply produced and easily installed.

With the above and other objects in view this invention has particular relation to certain novel features of construction, operation and arrangement of parts, an example of which is given in this specification and illustrated in the accompanying drawings wherein:

Figure 1 shows a plan view of the device partly in section,

Figure 2 shows a vertical sectional view thereof.

Figure 3 shows a plan view of a modified form thereof.

Figure 4 shows a vertical sectional view on the line 4—4 of Figure 3, and

Figure 5 shows a side view of a trap employed.

Referring now more particularly to the drawings wherein like numerals of reference designate similar parts in each of the figures, the numeral 1 designates the refrigerator, of conventional form and having the drain nozzle 2. The numeral 3 designates a drain pipe which is fitted through the floor 4, with its upper end projecting above said floor. Threaded on said upper end of the pipe 3 there is a bowl 5 having an internal annular rim 6.

The numeral 7 designates a drip pan, one end of which is mounted on the bowl 5, said pan extending out laterally beyond said bowl forming a drain chute 8.

The bottom of the pan 7 is reduced, as at 9, so as to fit within the rim 6, and, opposite the chute 8, has a lip 10, adapted to engage under said rim to hold the pan in place.

The bottom of the reduced portion of the pan has an annular row or perforations 11 and within said row has a depending annular flange 12 which surrounds the drain pipe 3 and is spaced therefrom and depends down into the bowl 5 and forms a trap therewith.

In an obvious manner the drip pan may be rotated, as desired to align the drain chute 8 underneath the nozzle 2. The drippings will fall into the drain chute and drain thence through the perforations 11 into the bowl 5 and pass thence through the drain pipe 3.

In the form shown in Figures 3 to 5 inclusive the inner end of the drain chute 8' rests on the rim of the bowl 6 and has the laterally diverging spaced lugs 13, 13 which engage under said rim. The chute is maintained against endwise movement on the bowl by means of said lugs 13 and the outside lug 14 which depends therefrom and works against the outside of the bowl.

An inverted cup shaped trap 15, having spaced legs 16 is disposed in the bowl over the upper end of the drain pipe 3 to prevent the return of offensive gases and odors in the usual way.

What I claim is:—

1. The combination with a drain pipe, of a bowl secured to the upper end of said pipe, a pan independent of and rotatably mounted relative to said bowl and having a lateral extension and provided with a drain port above the bowl.

2. The combination with a drain pipe, of a bowl secured to the upper end thereof and having an annular inwardly extending rim, a drip pan having a reduced bottom which fits within said rim, said bottom having a drain port, said pan being extended laterally beyond the bowl.

3. The combination with a drain pipe, of a bowl secured to the upper end thereof and having an annular inwardly extending rim, a drip pan having a reduced bottom which fits within said rim, said bottom having a drain port, said pan being extended laterally beyond the bowl and a lip carried by the pan and extending underneath said rim.

4. The combination with a drain pipe, of a bowl secured to the upper end thereof and having an annular inwardly extending rim, a drip pan having a reduced bottom which fits within said rim, said bottom having a drain port, said pan being extended laterally beyond the bowl, a lip carried by the pan and extending underneath the rim and an annular flange depending from the pan down into said bowl.

5. In combination a bowl having a drain pipe, a pan whose bottom is reduced and fitted within the bowl and provided with a drain port, a lateral extension carried by the pan, said pan being rotatable on the bowl, an annular flange depending from the pan down into the bowl and means retaining the pan on the bowl.

6. In combination a bowl having a drain pipe, an annular inwardly extending rim carried by the bowl, a drip pan rotatable on the bowl, and having a drain port and a lateral extension beyond the bowl and means retaining the pan on the bowl, said means comprising a lip carried by the pan and engaging under the rim.

7. A drip pan having a reduced bottom formed with a drain port, a lateral extension carried by, and forming part of, said pan, an outwardly extending lip carried by the pan opposite said extension and, a depending annular flange carried by said pan.

8. The combination with a drain pipe and a bowl carried thereby having an inwardly extending rim of a lateral drain chute associated therewith and mounted to revolve relative to said pipe, and means carried by the chute and engaging said rim.

9. The combination with a bowl having a drain outlet and an inwardly extending rim, of a lateral drain chute associated with the bowl and revolvable relative thereto, and a lip carried by said chute and engaging said rim.

In testimony whereof I have signed my name to this specification.

JOHN A. RAWLINGS.